(12) United States Patent
Cambron et al.

(10) Patent No.: US 10,864,537 B2
(45) Date of Patent: Dec. 15, 2020

(54) STATIC MIXING DEVICE AND METHOD OF MANUFACTURING STATIC MIXING DEVICE

(71) Applicant: Advanced Solutions Life Sciences, LLC, Louisville, KY (US)

(72) Inventors: Scott Douglas Cambron, Louisville, KY (US); Justin Palmer, Louisville, KY (US)

(73) Assignee: Advanced Solutions Life Sciences, LLC, Louisville, KY (US)

( * ) Notice: Subject to any disclaimer, the term of this patent is extended or adjusted under 35 U.S.C. 154(b) by 135 days.

(21) Appl. No.: 15/793,872

(22) Filed: Oct. 25, 2017

(65) Prior Publication Data

US 2018/0111138 A1 Apr. 26, 2018

Related U.S. Application Data

(60) Provisional application No. 62/412,354, filed on Oct. 25, 2016.

(51) Int. Cl.
*B05B 7/04* (2006.01)
*B01F 15/00* (2006.01)
(Continued)

(52) U.S. Cl.
CPC .......... *B05B 7/0408* (2013.01); *B01F 5/0602* (2013.01); *B01F 5/0615* (2013.01);
(Continued)

(58) Field of Classification Search
CPC ............ B01F 13/1016; B01F 15/00922; B01F 15/00928; B01F 15/00935; B01F 15/0495;
(Continued)

(56) References Cited

U.S. PATENT DOCUMENTS

| 1,720,247 A | * | 7/1929 | Smith | ...................... | F02M 1/00 |
| | | | | | 48/189.4 |
| 1,730,453 A | * | 10/1929 | Devon | ................... | F02M 29/04 |
| | | | | | 48/189.4 |

(Continued)

FOREIGN PATENT DOCUMENTS

| CN | 202844902 U | * | 4/2013 |
| DE | 19855128 A1 | | 6/2000 |

OTHER PUBLICATIONS

Machine Translation of DE19855128, 6 pages.
(Continued)

*Primary Examiner* — Tony G Soohoo
(74) *Attorney, Agent, or Firm* — Dinsmore & Shohl LLP

(57) ABSTRACT

Multi-component fluid mixing devices and methods of manufacturing and using such multi-component fluid mixing devices are provided. The multi-component fluid mixing devices include one or both of a serpentine flow path and an attachment point decoupled from an inlet of the multi-component fluid mixing devices. The method of use includes switching between multi-component fluid mixing devices with different length flow paths, while retaining a constant position of the outlet of the multi-component fluid mixing devices. A manufacturing method includes fusing two halves of a multi-component fluid mixing device together with mixing elements in a serpentine flow path captured in a mixer wall formed between the two halves of the multi-component fluid mixing device.

13 Claims, 10 Drawing Sheets

(51) Int. Cl.
    *B01F 15/04* (2006.01)
    *B01F 5/06* (2006.01)
    *B01F 13/10* (2006.01)
    *B29B 7/74* (2006.01)

(52) U.S. Cl.
    CPC .... *B01F 13/1016* (2013.01); *B01F 15/00922* (2013.01); *B01F 15/00928* (2013.01); *B01F 15/00935* (2013.01); *B01F 15/0495* (2013.01); *B29B 7/7438* (2013.01); *B29B 7/7457* (2013.01); *B01F 2215/006* (2013.01)

(58) Field of Classification Search
    CPC   B01F 2215/006; B01F 5/0602; B01F 5/0615; B05B 7/0408; B29B 7/7438; B29B 7/7457
    USPC .......................... 366/226, 227, 338, 229, 340
    See application file for complete search history.

(56) References Cited

U.S. PATENT DOCUMENTS

| | | | | | |
|---|---|---|---|---|---|
| 2,645,463 | A | * | 7/1953 | Stearns | B01F 5/0403 366/158.5 |
| 3,119,704 | A | * | 1/1964 | Harrell | B28C 5/381 106/682 |
| 3,779,518 | A | * | 12/1973 | Koepke | B01F 5/0646 366/152.3 |
| 3,806,097 | A | * | 4/1974 | Devellian | B01F 5/0615 366/339 |
| 4,241,023 | A | * | 12/1980 | Wilke | B01F 3/088 422/187 |
| 4,407,431 | A | * | 10/1983 | Hutter, III | B01F 3/088 141/107 |
| 4,641,705 | A | * | 2/1987 | Gorman | F28F 13/125 165/109.1 |
| 4,643,336 | A | * | 2/1987 | Mandeville | B29B 7/7438 222/145.6 |
| 5,076,705 | A | * | 12/1991 | Brickhouse | B01F 5/0602 137/512.1 |
| 5,350,233 | A | * | 9/1994 | Sonntag | B01F 5/0646 366/160.5 |
| 5,433,084 | A | * | 7/1995 | Kaiser | A23G 3/0221 261/140.1 |
| 5,542,578 | A | * | 8/1996 | Buckles | B01F 5/0646 222/145.6 |
| 5,766,490 | A | * | 6/1998 | Taylor | C02F 1/72 210/758 |
| 5,909,959 | A | * | 6/1999 | Gerich | B01F 5/0615 222/459 |
| 6,079,868 | A | * | 6/2000 | Rydell | A61B 17/00234 222/145.6 |
| 6,629,775 | B2 | * | 10/2003 | Choikhet | B01F 5/0602 366/336 |
| 6,971,787 | B2 | * | 12/2005 | Botrie | B01F 5/0613 222/145.6 |
| 8,079,751 | B2 | * | 12/2011 | Kapila | B01F 3/0865 366/158.5 |
| 8,317,390 | B2 | * | 11/2012 | Albrecht | B01F 3/02 366/337 |
| 8,511,889 | B2 | * | 8/2013 | Choikhet | B01F 5/064 138/40 |
| 2009/0207685 | A1 | | 8/2009 | Busin et al. | |
| 2011/0288060 | A1 | * | 11/2011 | Ruecroft | B01D 9/005 514/174 |
| 2013/0250714 | A1 | | 9/2013 | Harboe et al. | |

OTHER PUBLICATIONS

Machine Translation of CN202844902, 3 pages.
International Search Report and Written Opinion of corresponding PCT/US2017/058355 dated Jan. 9, 2018.

* cited by examiner

STATIC MIXING DEVICE AND METHOD OF MANUFACTURING STATIC MIXING DEVICE

CROSS-REFERENCE TO RELATED APPLICATIONS

This application claims the benefit of U.S. Provisional Application 62/412,354, filed Oct. 25, 2016, which is incorporated by reference in its entirety.

TECHNICAL FIELD

The present application generally relates to mixing multi-component fluids using static mixers and, more particularly, to systems utilizing swappable static mixing devices, which include various lengths of static mixer elements, for mixing two or more liquids dispensed from a robotic multi-component fluid dispensing device and methods of manufacturing the swappable static mixing devices.

BACKGROUND

Static mixers, also known as motionless mixers, have been in use for decades in applications, such as mixing two-part adhesives. Two fluid components, typically liquids, are blended or mixed together by being forced through a series of non-moving mixing elements such as plates, spirals, or baffles, etc. The number of mixing elements required to achieve the desired mixing of the fluid components depends on various factors, such as viscosity and miscibility of the fluid components, the inner diameter of the channel containing the mixing elements, and the design of the mixing elements. For example, in general, a higher difference in the viscosities between the fluid components requires a higher degree of mixing in order to achieve the desired mixing or desired blend. All else being held equal, a higher degree of mixing requires more mixing elements, and thus, a longer static mixer.

Current static mixers have an inlet at one end, which attaches to a corresponding opening of the multi-component fluid dispensing device, to receive the multi-component fluid to be mixed. The multi-component fluid travels around or through the mixing elements on a flow path from the inlet to the outlet of the static mixer. Although the precise flow path of the multi-component fluid within the static mixer may be circuitous, the side walls of the static mixer guide the overall flow direction in a straight line between the inlet and the outlet. In current static mixers, the distance between the inlet and the outlet is determined by the length of the static mixer. Thus, when a different amount of mixing is required, or the components of the multi-component fluid are changed, the distance between the inlet and the outlet also changes.

When used with a robotic multi-component fluid dispensing device, changing the length of the static mixer to accommodate different fluid components may require recalibration to adjust for the different distance between the inlet and the outlet. However, space constraints or mechanical limits of the robotic multi-component fluid dispensing device may place limits on the amount of calibration possible and thus preclude the use of certain combinations of fluids in the robotic multi-component fluid dispensing device. Even where space constraints are not an issue, recalibrating for large changes in the distance to the static mixer outlet can result in reduced precision in dispensing the multi-component fluid.

Accordingly, a need exists for swappable static mixers that allow for mixing a variety of different multi-fluid components without resulting in large changes in the position of the static mixer outlet when switching between different fluid components or different mixer lengths.

SUMMARY

A multi-component fluid mixing device may comprise a first static mixer configured to receive a first fluid component and a second fluid component, which form a multi-component fluid, and at least partially mix the multi-component fluid as the multi-component fluid flows in a first flow direction along a longitudinal axis of the first static mixer. The multi-component fluid mixing device may further comprise a second static mixer configured to receive the multi-component fluid and further mix the multi-component fluid as the multi-component fluid flows in a second flow direction, different from the first flow direction, along a longitudinal axis of the second static mixer. A first connecting channel may connect a second end of the first static mixer to a first end of the second static mixer to form a flow path of the multi-component fluid. An outlet may be connected to the flow path of the multi-component fluid and configured to output the mixed multi-component fluid.

Another embodiment of the multi-component fluid mixing device may further comprise a third static mixer and a fourth static mixer, wherein the static mixers are positioned parallel to each other and the flow path alternates between the first flow direction and the second flow direction, creating a serpentine flow path. The multi-component fluid mixing device may further comprise a first end piece proximate to the first end of the first static mixer, a second end piece proximate to the second end of the first static mixer and containing the first connecting channel, a first channel group comprising the first connecting channel, and a second of channel group comprising a second connecting channel housed in the first end piece and a third connecting channel housed in the second end piece. The first channel group may be configured to connect the first static mixer and the second static mixer to form the flow path of the multi-component fluid, excluding the third static mixer and the fourth static mixer from the flow path of the multi-component fluid, and the second channel group may be configured to connect the first static mixer, the second static mixer, the third static mixer, and the fourth static mixer to form the flow path of the multi-component fluid. The multi-component fluid mixing device may further comprise an adjustment mechanism configured to switch between the first channel group and the second channel group.

Another embodiment of the multi-component fluid mixing device may comprise a static mixer configured to receive a first fluid component and a second fluid component, which form a multi-component fluid and at least partially mix the multi-component fluid as the multi-component fluid flows along a flow path comprising a first flow direction from a first end of the static mixer to a second end of the static mixer. The multi-component fluid mixing device may further comprise an outlet configured to output the multi-component fluid and an attachment point configured to secure the multi-component fluid mixing device to a multi-component fluid dispensing device, wherein a location of the attachment point is determined based on a spatial relationship to the outlet, such that a position of the outlet is determined independent of a length of the static mixer.

Another embodiment of the multi-component fluid mixing device may further comprise a first inlet configured to receive the first fluid component and a second inlet configured to receive the second fluid component, wherein the first end of the static mixer is connected to both the first inlet and the second inlet. The attachment point may be further configured to allow removal of the multi-component fluid mixing device, with the first inlet and second inlet, from the multi-component fluid dispensing device.

Another embodiment of the multi-component fluid mixing device may further comprise a planar tongue on a first plane substantially parallel to the first flow direction. The planar tongue may comprise a base configured to constrain a position of the mixing device in a Y-direction when the mixing device is attached to the multi-component fluid dispensing device and a tapered end opposite the base and configured to align the multi-component fluid mixing device with a corresponding tapered groove of the multi-component fluid dispensing device, and constrain the position of the mixing device in an X-direction and a Z-direction when the mixing device is attached to the multi-component fluid dispensing device. The attachment point may be proximate to the base and further configured to secure the base to the multi-component fluid dispensing device.

According to one embodiment, a method of using a multi-component fluid dispensing device comprises attaching a first static mixer to a multi-component fluid dispensing device using an attachment point, on the first static mixer, disposed at a first distance from a dispensing outlet of the first static mixer, causing a first multi-component fluid to travel a first mixing distance to the dispensing outlet of the first static mixer, removing the first static mixer from the multi-component fluid dispensing device, attaching a second static mixer to the multi-component fluid dispensing device using an attachment point, on the second static mixer, disposed at the same first distance from a dispensing outlet of the second static mixer, and causing the first multi-component fluid or another multi-component fluid to travel a second mixing distance, different from the first mixing distance, to the dispensing outlet of the second static mixer.

According to one embodiment, a method of manufacturing a multi-component fluid mixing device comprises molding a first part of the multi-component fluid mixing device, and molding a second part of the multi-component fluid mixing device, wherein at least one of the first part or second part comprises a mixer wall configured to receive a mixing element; and an attachment point configured to secure the multi-component fluid mixing device to a multi-component fluid dispensing device. The method of manufacturing the multi-component fluid mixing device comprises placing the mixing element into the mixer wall, mating the first part to the second part with the mixing element captured in the mixing wall between the first part and second part, and bonding the first part to the second part, securing the mixing element, within the mixer wall, between the first part and second part.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
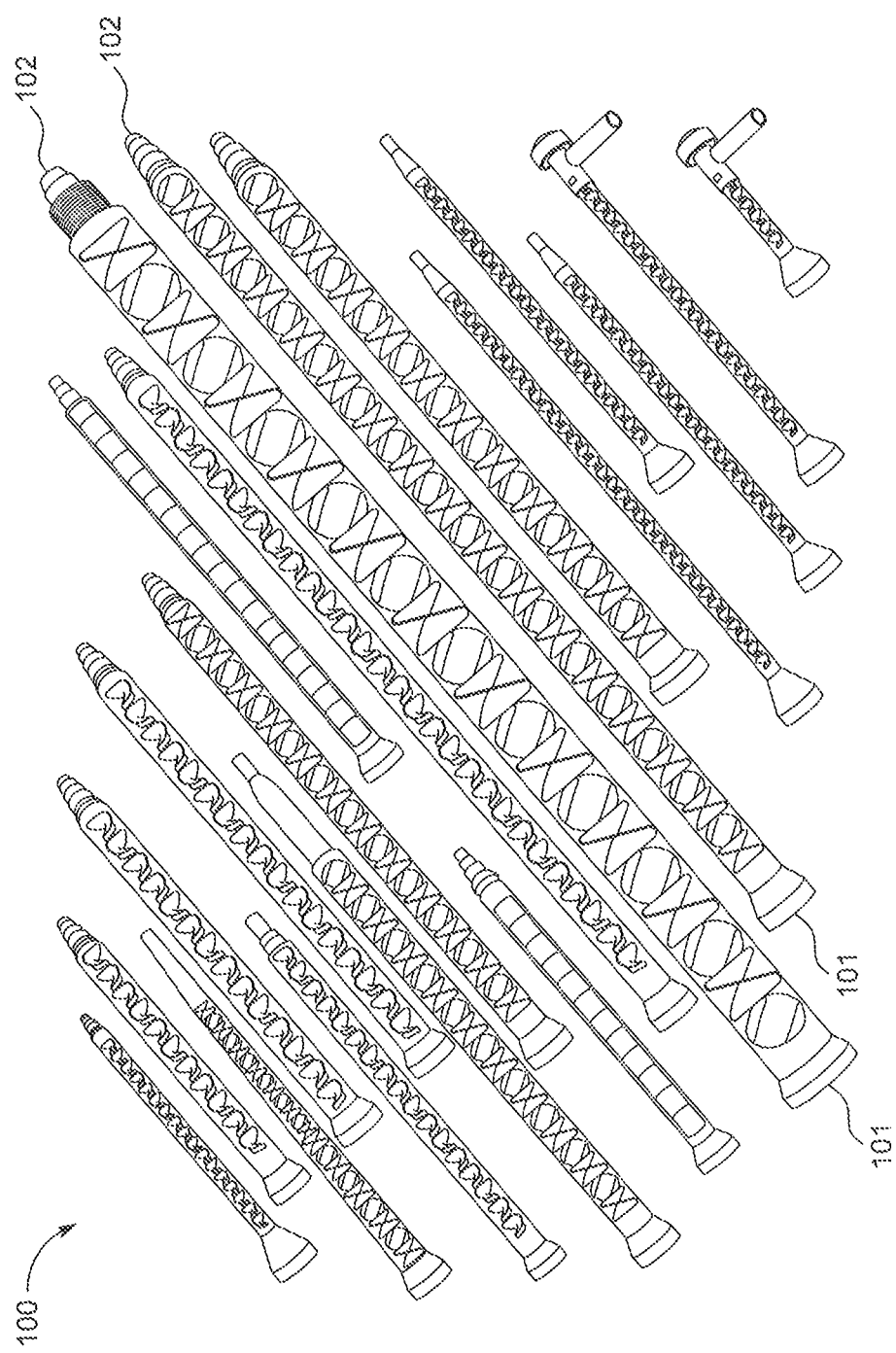
FIG. 1 shows prior art mixers of various lengths, which attach at the inlet, making the position of the outlet dependent on the length of the mixer.

Referring to FIG. 1, various prior art static mixers 100 are shown side by side with the inlets 101 aligned at the bottom of the figure, and the outlets 102 are pointed upward. The static mixers 100 of FIG. 1 each attach to a multi-component fluid dispensing device at the inlet 101. As can be seen in FIG. 1, the position of the outlet 102 of each prior art mixer is determined by the length of the mixer. It is understood that when switching between fluid components or when changing the desired mixing amount, a different static mixer may be required. Because different fluid components may require different static mixer lengths, there is no guarantee that the outlet 102 will be at the same position relative to the multi-component fluid dispensing device after switching to a different static mixer.

Figure 2:
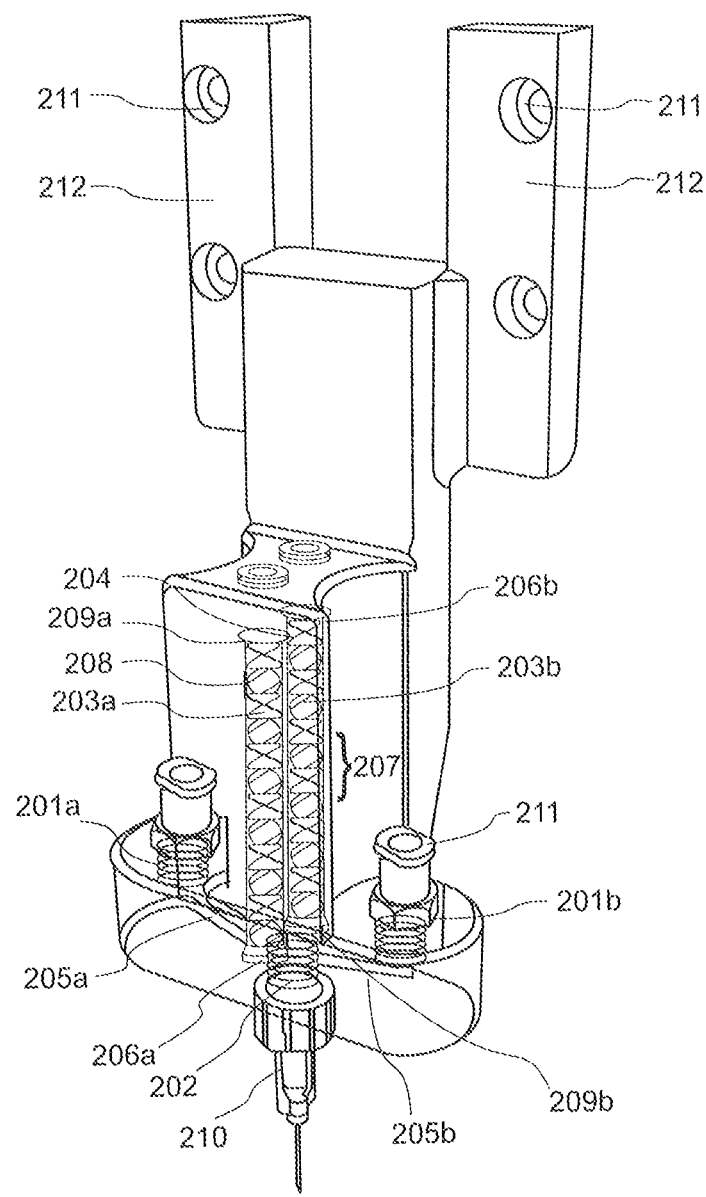
FIG. 2 illustrates an embodiment of a multi-component fluid mixing device comprising two mixers connected in a serpentine flow path with a connecting channel between them. An attachment point may be positioned at the inlets while the static mixers form a serpentine flow path, which puts the outlet in a position independent of the length or number of mixers.

FIG. 2 illustrates an embodiment of a multi-component fluid mixing device comprising two mixers connected in a serpentine flow path with a connecting channel between them. An attachment point may be positioned at the inlets while the static mixers form a serpentine flow path, which puts the outlet in a position independent of the length or number of mixers.

According to some embodiments, it may be desirable to split the inlet into two or more inlets 201a, 201b, based on the number of multi-fluid components to be mixed. In FIG. 2, a first inlet 201a is configured to receive a first fluid component and a second inlet 201b is configured to receive a second fluid component A person of ordinary skill in the art would understand that any number of inlets may be used to accommodate any number of fluid components. According to one embodiment shown in FIG. 2, the inlets are configured to accept luer lock check valves for controlling flow of the first fluid component and the second fluid component into the multi-component fluid mixing device. Each inlet in FIG. 2 connects to an inlet channel 205a, 205b leading to a first end 206a of a first static mixer 203a, where the multiple fluid components meet to form the multi-component fluid. The storage mechanism for each the fluid components may be a tube or barrel with a syringe-type dispensing mechanism or a pressurized chamber containing the fluid component but is not limited to those options. Any type of fluid dispensing mechanism may be used in conjunction with the embodiments described herein without limitation. The specifics of the fluid component storage mechanism are outside the scope of this embodiment and will not be described in detail here.

The static mixers 203a, 203b in FIG. 2 each comprise one or more mixing elements 207 contained within a mixer wall 208. The static mixer 203a, 203b may be any device that comprises one or more mixing elements 207 which cause at least some mixing of a fluid as the fluid flows through or around the mixing elements along a flow path defined by the mixer wall 208. The static mixers 203a, 203b may contain any type of mixing element and may be of any dimensions without limitation. Because the present embodiments may be used with any type of static mixer or any type of mixing elements, the specific features of the static mixers or mixing elements will not be described in detail herein. A person skilled in the art should understand that although one type of static mixer or mixing element is shown, this is done only as an example and is not intended to limit the embodiments described to any particular type of static mixer or mixing element. A person or ordinary skill in the art would be capable of determining what mixer elements or static mixer specifications should be used to achieve the desired results for the fluid components to be mixed.

Referring again to FIG. 2, the multi-component fluid flows through the first static mixer 203a along a flow path in a first flow direction, along a longitudinal axis of the first static mixer 203a, from the first end 206a of the first static mixer 203a to the second end 209a of the first static mixer 203a, at which point the multi-component fluid is at least partially mixed. At the second end 209a of the first static mixer 203a, a connecting channel 204 guides the multi-component fluid to a first end 206b of the second static mixer 203b. Although the embodiment of FIG. 2 shows the connecting channel 204 in a straight line connection between the first static mixer 203a and the second static mixer 203b, this is only an example and is not intended to be limiting. According to one embodiment, the connecting channel 204 may be at a right angle to the first static mixer 203a and the second static mixer 203b or the connecting channel 204 may form a u-shaped curve to connect the first static mixer 203a with the second static mixer 230b, or the connecting channel may be of any other shape without limitation.

The multi-component fluid then follows the flow path in a second flow direction, along a longitudinal axis of the second static mixer 203b, from the first end 206b of the second static mixer 203b to the second end 209b of the second static mixer 203b. According to one embodiment, the first flow direction flows generally away from the outlet 202, while the second flow direction flows generally toward the outlet 202. According to another embodiment, illustrated in FIG. 2, the first static mixer 203a and the second static mixer 203b are parallel to each other, so the second flow direction is opposite the first flow direction. However, other configurations of the static mixers 203a, 203b may also be used without departing from the spirit and scope of the disclosed embodiments. For example, the longitudinal axes of the static mixers 203a, 203b may converge to form a V-shape with the first end 206a of the first static mixer 203a and the second end 209b of the second static mixer 203b proximate to each other with an elongated connecting channel 204 between the second end 209a of the first static mixer 203a and the first end 206b of the second static mixer 203b. In this embodiment, the first flow direction and second flow direction are different from each other, but not necessarily opposite. In another embodiment, a third static mixer (not shown) may form the connecting channel 204 between the first static mixer 203a and the second static mixer 203b such that the first flow direction, the second flow direction, and a third flow direction are all different from each other. According to another embodiment comprising three static mixers, the third static mixer forming the connecting channel between the first static mixer 203a and the second static mixwer 203b may be of a different length than the first and second static mixers 203a, 203b.

At the second end 209b of the second static mixer 203b is an outlet 202. The outlet 202 may be immediately at the second end 209a of the second static mixer 203b, or there may be an outlet channel between the second end 209b of the second static mixer 203b and the outlet 202. According to one embodiment, the outlet forms a dispensing tip that is integrated with the multi-component fluid mixing device 200. According to another embodiment, the outlet 202 is configured to receive a dispensing tip 210. The embodiments described herein are not limited to any particular mechanism for attaching the dispensing tip 210 to the outlet 202. The outlet 202 may be configured to accept a luer lock dispensing tip 210 or any other type of connection without limitation.

According to one embodiment, the multi-component mixing device 200 may connect to a multi-component fluid dispensing device (not shown) by attachment points 211 comprising luer lock fittings 213 at the first inlet 201a and second inlet 201b. According to another embodiment, the multi-component mixing device 200 may connect to a multi-component fluid dispensing device by an independent attachment means 212 comprising multiple attachment points 211 for securing the multi-component mixing device 200 to the multi-component fluid dispensing device.

Regardless of whether the multi-component mixing device 200 attaches to the multi-component fluid dispensing device by an attachment point 211 at the inlets 201a, 201b or the attachment points 211 of the independent attachment means 21, the attachment points 211 are positioned in a fixed relationship to the outlet 202 such that the position of the outlet 202 is independent of the length of the static mixers 203a, 203b.

For example, if the multi-component mixing device 200 is attached to the multi-component fluid dispensing device by the attachment points 211 at the inlets 201a, 201b, the serpentine flow path allow the inlets 201a, 201b to be in a fixed positional relationship to the outlet, independent of the length of the first static mixer 203a or second static mixer 203b. Therefore, regardless of the length of the static mixers 203a, 203b, the outlet remains in the same position, relative to the multi-component fluid dispensing device, across different multi-component mixing devices with different static mixer lengths or configurations. As another example, if the multi-component mixing device 200 is attached to the multi-component fluid dispensing device by the attachment points 211 of the independent attachment means 212, the position of the outlet, relative to the attachment points 211, remains fixed and is independent of the length or configuration of the static mixers 203a, 203b. Therefore, when an independent attachment means is used, the attachment point 211 is decoupled from the inlets, allowing the inlets 201a, 201b to be in any position or configuration to accommodate any length of single or multiple static mixers without influencing the position of the outlet.

According to an embodiment, it may be preferable for the attachment point to be as distally located from the multi-component fluid dispensing device as possible without exceeding a plane where the outlet is disposed.

Whether the attachment point 211 is at the inlets 201a, 201b, or on an independent attachment means 212, the multi-component mixing device 200 can accommodate different numbers of static mixers, a variety of different flow path lengths, and a variety of different static mixer lengths without influence on the position of the outlet relative to the multi-component fluid dispensing device to which the multi-component mixing device 200 would be attached. This allows a variety of different multi-component mixing devices, with a variety of different mixing capabilities, to be swapped onto the same multi-component fluid dispensing device, to accommodate a variety of different fluid components, without requiring recalibration for a different outlet position each time a different multi-component mixing device is used.

Figure 3:
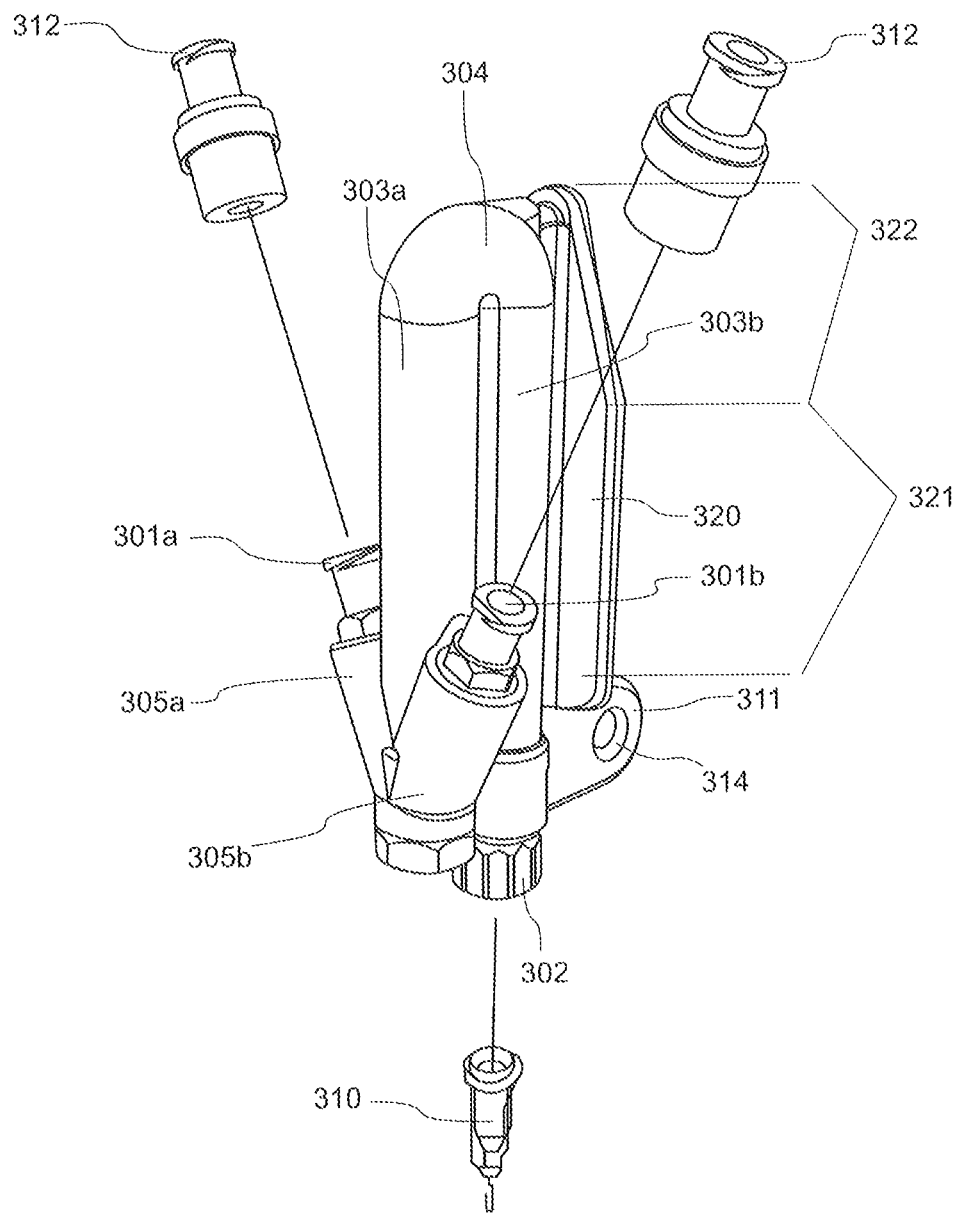
FIG. 3 illustrates an embodiment of a multi-component fluid mixing device comprising two mixers and a connecting channel, an attachment point, first and second inlets and an outlet with luer lock connections for check valves, and a dispensing tip. The static mixers form a serpentine flow path and the attachment point is decoupled from the inlets. The outlet position is independent of the mixer lengths or configuration.

FIG. 3 illustrates an embodiment of a multi-component fluid mixing device comprising two mixers and a connecting channel, an attachment point, first and second inlets and an outlet with luer lock connections for check valves, and a dispensing tip. The static mixers form a serpentine flow path and the attachment point is decoupled from the inlets. The outlet position is independent of the mixer lengths or configuration.

The embodiment illustrated in FIG. 3 has many similarities to the embodiment illustrated in FIG. 2, which will not be described again here. FIG. 3 also illustrates the inlets 301a, 310b forming a V-shape with inlet channels 305a, 305b converging at the first end 306a of the first static mixer 303a. This illustration of the inlets 301a, 310b and the inlet channels 305a, 305b is not intended to be limiting. The inlets 301a, 301b and inlet channels 305a, 305b may be in any orientation relative to the first end 306a of the first static mixer 303a in order to accommodate spatial constraints of the multi-component fluid dispensing device to which the multi-component fluid mixing device is to be attached. The connecting channel 304, illustrated in FIG. 3, is in an arc-shape or U-shape between the second end 309a of the first static mixer 303a and the first end 306b of the second static mixer 303b. FIG. 3 also illustrates where the luer lock check valves 312 attach to the inlets 301a, 301b and the luer lock dispensing tip 310 attaches to the outlet 302.

Figure 5:
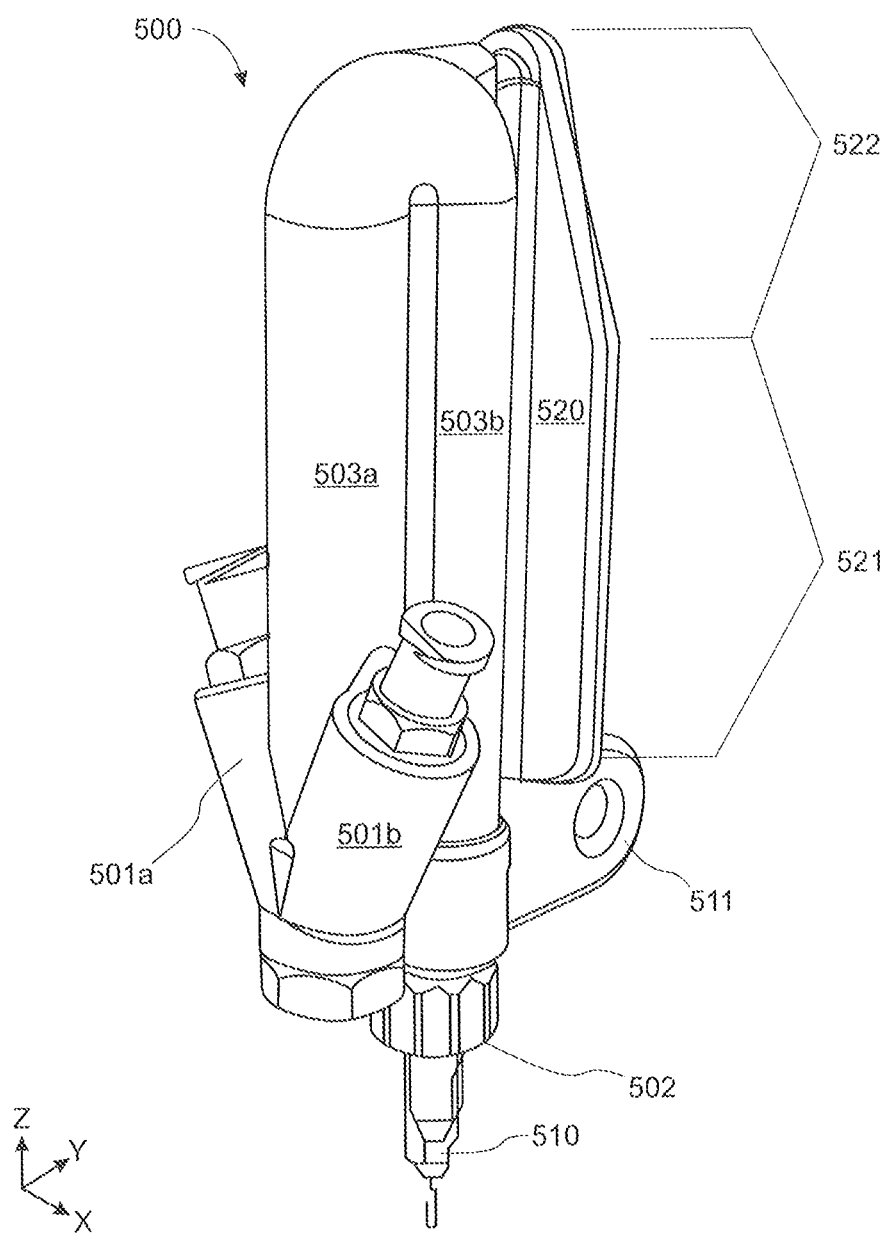
FIG. 5 illustrates an embodiment of a multi-component fluid mixing device attached to a multi-component fluid dispenser in a 3-dimensional coordinate system with luer lock check valve inputs and a dispensing tip attached.

According to an embodiment illustrated in FIG. 3, a planar tongue 320 is disposed at a back side of the multi-component fluid mixing device. The back side of the multi-component fluid mixing device is a side that attaches to the multi-component fluid dispensing device. The planar tongue comprises a base 321, proximate to the outlet 302 end of the multi-component fluid mixing device, and a tapered end 322 opposite the base 321. The base 321 is substantially flat and configured to adjoin, or otherwise mate to a corresponding surface of the multi-component fluid dispensing device. The base 321 constrains the position of the multi-component fluid mixing device in the Y-direction on a 3-axis coordinate system, as shown in FIG. 5. The tapered end 322 is configured to fit into a corresponding tapered slot in the multi-component fluid dispensing device and constrain the position of the multi-component fluid mixing device on the multi-component fluid dispensing device in the X-direction and Z-direction. The tapered end 322 may also be configured to fit under a lip of the multi-component fluid dispensing device in order to constrain the position of the tapered end 322 in the Y-direction as well as the X-direction and the Z-direction.

The attachment point 311 in the embodiment of FIG. 3 is proximate to the base 321 and the outlet 302 and configured to secure the multi-component fluid mixing device to the multi-component fluid dispensing device. The attachment point 311 is decoupled from and independent of the inlets 301a, 301b and maintains a fixed positional relationship with the outlet 302 such that the position of the outlet 302 is independent of the length of the mixing device or the location of the inlets 301a, 301b.

According to one embodiment, the attachment point 311 comprises a hole 314 that may receive a peg, thumb screw, or other securing means to secure the multi-component fluid mixing device to the multi-component fluid dispensing device. A person of ordinary skill in the art would understand that the specific design of the securing means, and by extension the attachment point, is not critical so long as the securing means is capable of holding or securing the multi-component fluid mixing device to the multi-component fluid dispensing device in a manner that allows removal by the user. Thus, the securing means may be a peg, rod, pin, spring pin, linchpin, cotter pin, plate, clamp, screw, thump screw, bolt, nut, adhesive, hook and loop, zip-tie, or any other user-removable fastening or securing device, without limitation. The attachment point may be configured in any way necessary to accommodate the specific securing means chosen.

Figure 4A:
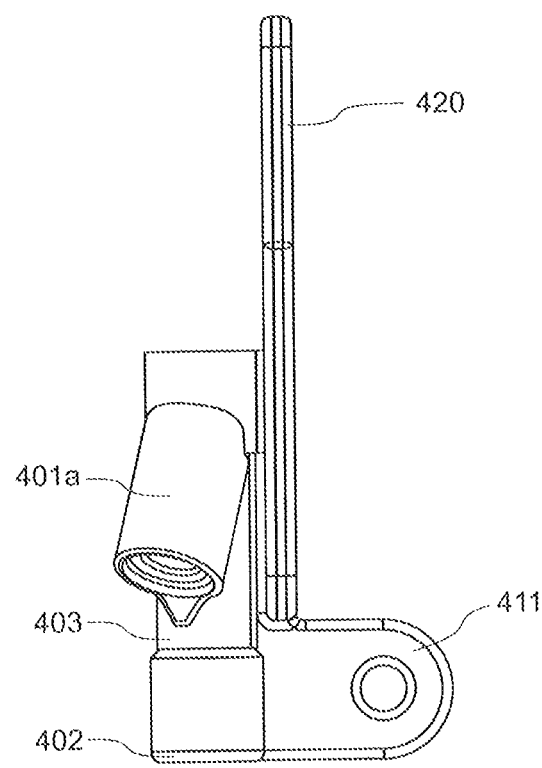
FIGS. 4A-4B illustrate embodiments of multi-component fluid mixing devices comprising single mixers of different lengths with the attachment point decoupled from the inlets and positioned so that the outlet position is independent of the mixer length.
Figure 4B:
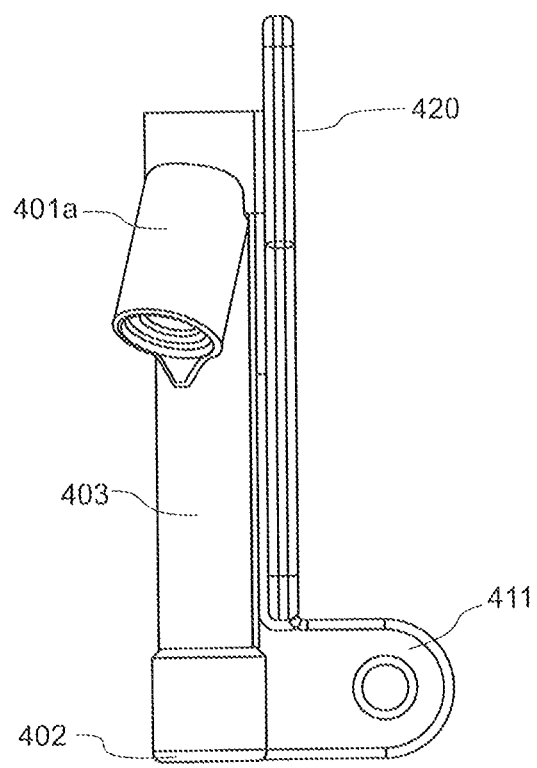

FIGS. 4A-4B illustrate embodiments of multi-component fluid mixing devices comprising single mixers of different lengths with the attachment point decoupled from the inlets and positioned so that the outlet position is independent of the mixer length.

FIGS. 4A and 4B each show a side view of a disclosed embodiment. In each of FIGS. 4A and 4B, the illustrated multi-component fluid mixing device comprises a single static mixer 403 and no connecting channel 304. The attachment point 411 is decoupled from the outlet 402 such that the position of the outlet 402 is fixed relative to the attachment point 411, and independent of the length of the static mixer 403. Whether the multi-component fluid mixing device of FIG. 4A or FIG. 4B is attached to the multi-component fluid dispensing device, the position of the outlet, relative to the multi-component fluid dispensing device, remains identical.

FIG. 5 illustrates an embodiment of a multi-component fluid mixing device attached to a multi-component fluid dispenser in a 3-dimensional coordinate system with luer lock check valve inputs and a dispensing tip attached.

According to an embodiment illustrated in FIG. 5, the planar tongue 520 is configured to adjoin multi-component fluid dispensing device at the base 521 and the base 521 is configured to constrain the position of the multi-component fluid mixing device in the Y-direction indicated by the 3-axis coordinate system in FIG. 5 by contacting a corresponding surface on the multi-component fluid dispensing device. A tapered end 522 of the planar tongue 520 is configured to contact and align with a corresponding groove in the multi-component fluid dispensing device and constrain the position of the multi-component fluid mixing device on the multi-component fluid dispensing device in the X-direction and Z-direction indicated by the 3-axis coordinate system in FIG. 5. The dispensing tip 510 is shown attached to the outlet 502. The attachment point is proximate to the outlet and independent of the inlets 501a, 501b so that the position of the outlet 502, and the dispensing tip 510, is independent of the configuration or length of the static mixers 503a, 503b.

Figure 6:
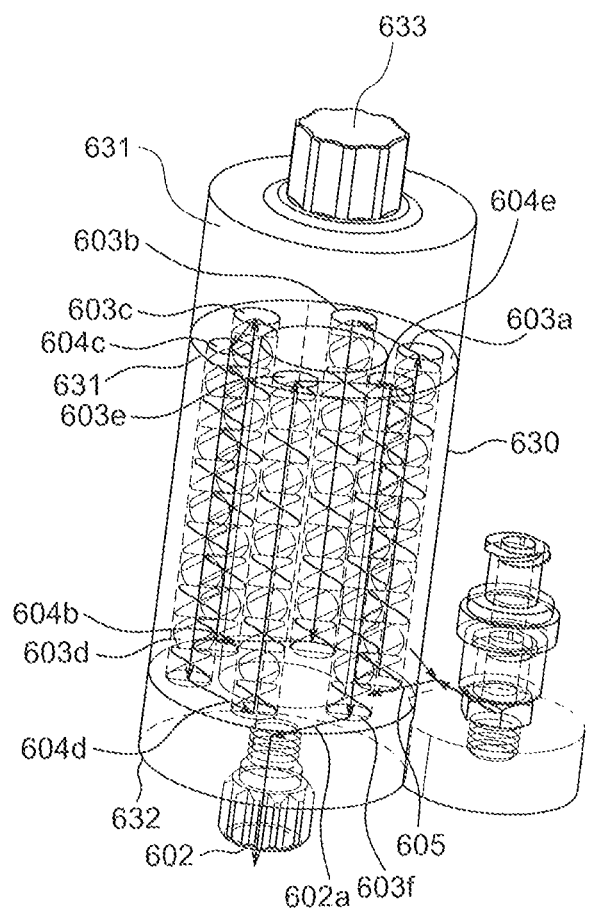
FIG. 6 illustrates an embodiment of an adjustable length multi-component fluid mixing device comprising multiple mixers, where the number of mixers is selectable by rotation between the mixers and end pieces.

FIG. 6 illustrates an embodiment of an adjustable length multi-component fluid mixing device comprising multiple mixers, where the number of mixers is selectable by rotation between the mixers and end pieces.

According to an embodiment illustrated in FIG. 6, a plurality of mixers 603a, 603b, 603c, 603d, 603e, and 603f are arranged in a circular pattern and contained in a canister 630. The canister is held between a first end piece 631 at the top of the canister 630 and a second end piece 632 at the bottom of the canister 630. The first end piece and second end piece 631, 632 contain connecting channels 604a, 604b, 604c, 604d, 604e, each of which is configured to redirect the flow of the multi-component fluid to another static mixer among the static mixers 603a, 603b, 603c, 603d, 603e, and 603f. The second end piece also contains an inlet channel 605 and an outlet channel 602a. According to the embodiment illustrated in FIG. 6, the number of mixers included in the flow path is adjustable by a rotation between the canister 630 and the first and second end pieces 631 and 632. According to one embodiment, the canister 630 rotates while the first end piece 631 and second end piece 632 remain stationary. According to another embodiment, the first and second end pieces 631, 632 rotate while the canister remains stationary. In either case, the rotation changes the configuration of connecting channels and static mixers, thereby changing the length of the serpentine flow path to accommodate different amounts of desired mixing or different fluid components.

Although either the static mixers or connecting channels may physically move with each rotation, for convenience and simplicity in the drawings, the static mixers and connecting channels may be identified by their positions identified in FIG. 6. For example, in a first configuration, connecting channel 604a connects the first and second static mixers 603a and 603b. Although this physical channel may be rotated to another position in a second configuration, the channel that connects the first and second static mixers 603a and 603b in the second configuration may nevertheless be identified as connecting channel 604a. Likewise, although the static mixer identified by 603a in a first configuration is rotated to a new position in a second configuration, the static mixer occupying the position at 603a in the second configuration may nevertheless be identified as the static mixer 603a.

According to one embodiment, the canister is in a first position corresponding to a first configuration that uses a first channel group, the multi-component fluid enters the first static mixer 603a at the bottom of the canister 630, proximate to the outlet 602, through the inlet channel 605, and flows in a first flow direction toward the first end piece 631 at the top of the first static mixer 603. The first channel group includes connecting channel 604a, which directs the multi-component fluid to the second static mixer 603. The multi-component fluid then flows in a second flow direction, opposite the first flow direction, through the second static mixer 603 back toward the second end piece 632, creating a serpentine flow path that includes two static mixers 603a and 603b.

According to one embodiment, the canister 630 may be rotated from the first position to a second position, while the first end piece 631 and second end piece 632 remain stationary, in order to enable a second configuration using a second channel group. The second channel group includes connecting channels at positions 604a, 604b, and 604c, which connect the static mixers at positions 603a, 603b, 603c, and 603d, to create a serpentine flow path that includes four static mixers.

According to one embodiment the canister 630 may be rotated from the second position to a third position, while the first end piece 631 and second end piece 632 remain stationary, in order to enable a third configuration using a third channel group. The third channel group includes connecting channels at positions 604a, 604b, 604c, 604d, and 604e which connect the static mixers at positions 603a, 603b, 603c, 603d, 603e, and 603f to create a serpentine flow path that includes six static mixers.

In another embodiment, the first end piece 631 and second end piece 632 rotate together, while the canister 630 remains stationary. In this embodiment, the three configurations are identical to the three configurations described above, except the first and second end pieces 631, 632 rotate rather than the canister 630. Therefore, a detailed description of the first, second, and third configurations of this embodiment will not be repeated here.

According to an embodiment, an adjustment mechanism 633 may be used to switch between different configurations of the multi-component fluid mixing device. According to one embodiment illustrated in FIG. 6, the adjustment mechanism 633 may be a knob at the first end piece 631 of the multi-component fluid mixing device. According to one embodiment, this adjustment mechanism 633 may be turned to cause the canister to rotate while the first end piece 631 and second end piece 632 remain stationary. According to another embodiment, the adjustment mechanism 633 may be turned to cause the first end piece 631 and second end piece 632 to rotate while the canister remains stationary.

Although the adjustment mechanism 633 is shown as a knob in FIG. 6, this is only for illustrative purposes and not intended to be limiting. A person of ordinary skill in the art would understand, based on the above disclosure and drawings, that the adjustment mechanism may take a variety of forms without departing from the spirit and scope of the disclosed embodiments. For example, the adjustment mechanism may be a lever or other type of handle, or the adjustment mechanism may be incorporated into the canister 630, or one or both of the first end piece 631 and the second end piece 632, in the form of a knurled or textured pattern that allows a user to grip and rotate the canister 630 or end pieces 631, 632. The adjustment mechanism may be any mechanism or feature that facilitates rotation between the canister 630 and the first and second end pieces 631, 632, without limitation.

Although the examples described above in relation to FIG. 6 include six static mixers and three different configurations, a person of ordinary skill in the art would recognize that many alternate configurations are rendered obvious by the above description. For example, the inlet channel 605 may be at the first end piece 631, while the outlet 602 is at the second end piece 632, and each configuration may include an odd number of static mixers rather than an even number of static mixers. As another example, based on the above description, a person of ordinary skill in the art may conceive of embodiments including three, four, five, or any number static mixers greater than six in a circular arrangement that allows changing between different configurations by rotation.

Figure 7A:
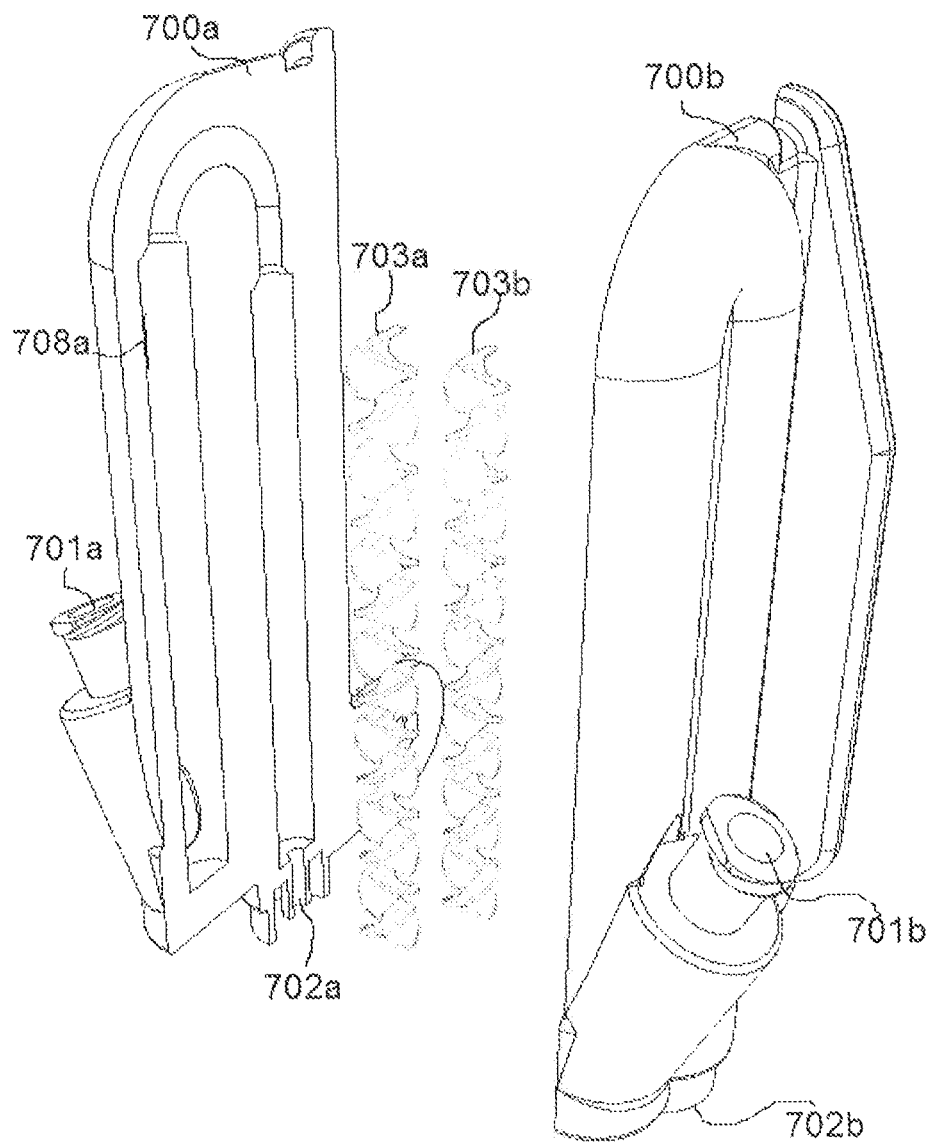
FIG. 7A illustrates a manufacturing process step, of a multi-component fluid mixing device, where two halves of the mixing device are brought together with a mixer element in between them.

FIG. 7A illustrates a manufacturing process step, of a multi-component fluid mixing device, where two halves of the mixing device are brought together with a mixer element in between them.

According to an embodiment illustrated in FIG. 7A, a manufacturing step is performed on a first part 700*a* and a second part 700*b* of the multi-component fluid mixing device, which, according to the illustrated embodiment, are molded halves of the multi-component fluid mixing device. Each half of the multi-component fluid mixing device includes and inlet 701*a*, 701*b*, and a half of the outlet 702*a*, 702*b*. Two mixing elements 707*a*, 707*b* are positioned between the molded first part 700*a* and the molded second part 700*b*. As illustrated in FIG. 7A, the mixing elements 707*a*, 707*b* fit into the mixer walls 708*a*, 708*b* formed in the halves multi-component fluid mixing device. Although in FIG. 7A, the mixer walls 708*a*, 708*b* are only visible in the first part 700*a* of the multi-component fluid mixing device, corresponding mixer walls are also formed in the second part 700*b* of the multi-component fluid mixing device. According to an embodiment of a manufacturing step, the first part 700*a* and second part 700*b* are mated together, or placed in proximity to each other, with the mixing elements 707*a*, 707*b* captured in the mixer walls between the first part 700*a* and the second part 700*b*.

Figure 7B:
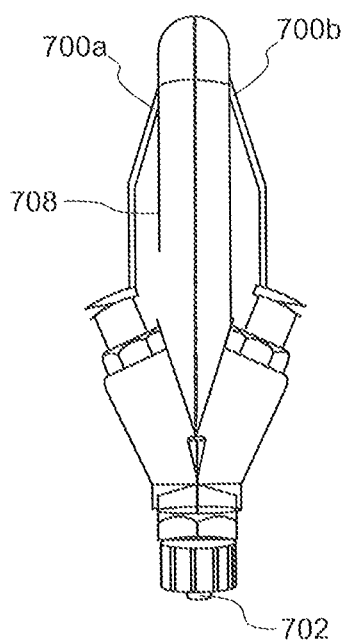
FIG. 7B illustrates a manufacturing process step, of a multi-component fluid mixing device, where the two halves of the mixing device are bonded together using adhesive bonding or ultrasonic welding, but bonding techniques are not limited to these.

FIG. 7B illustrates a manufacturing process step, of a multi-component fluid mixing device, where the two halves of the mixing device are bonded together using adhesive bonding and or ultrasonic welding, but bonding techniques are not limited to these.

According to an embodiment illustrated in FIG. 7B, the first part 700*a* and the second part 700*b* are bonded together to form the multi-component fluid mixing device with the mixing elements 703*a*, 703*b* in the mixer wall 708 formed by the combination of the first part 700*a* and the second part 700*b*. According to one embodiment, the first part 700*a* and second part 700*b* are bonded together using ultrasonic welding. According to another embodiment, the first part 700*a* and second part 700*b* are bonded together using adhesive bonding. According to yet another embodiment, the first part 700*a* and second part 700*b* are bonded together using a combination of ultrasonic welding and adhesive bonding. A person of ordinary skill in the art would understand that the first part 700*a* and second part 700*b* may be bonded together using any suitable fusing method, without limitation, as long as that fusing method creates a seal along the flow path from the mixer wall 708 to the outlet 702 to keep the multi-component fluid from leaking.

Although the mixing elements 703*a*, 703*b* are illustrated with a substantially identical design, this is not intended to be limiting and according to one embodiment, mixing elements of different designs may be used. For example, the first mixing element 703*a* may be of a first design, and a second mixing element 703*b* may be of a second, different design. As another example, two mixing elements of different designs may be used to form the first static mixer. A person of ordinary skill in the art would recognize that any combination of any type of mixing elements may be used in any of the embodiments disclosed herein without limitation.

Figure 8:
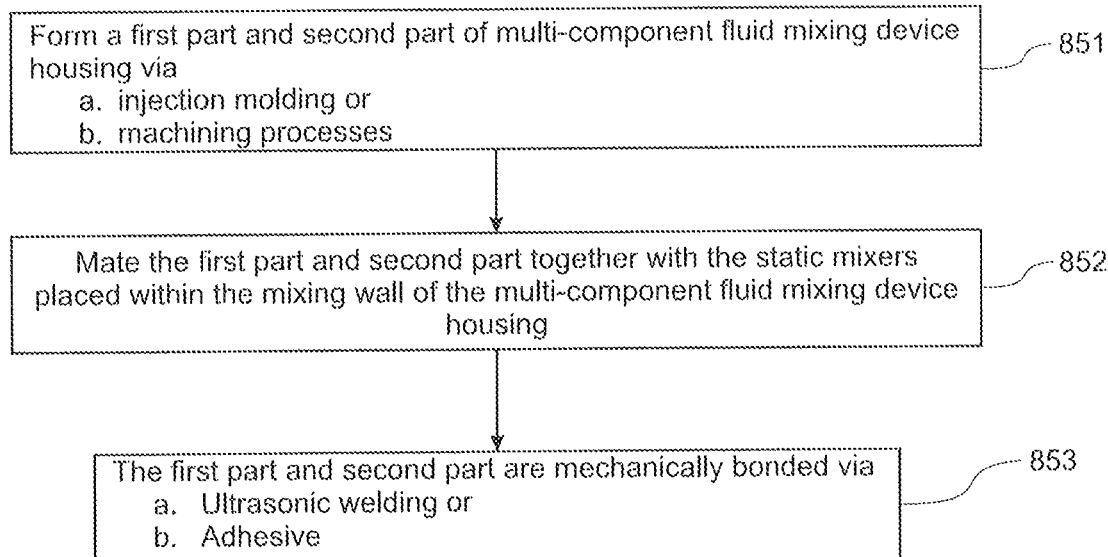
FIG. 8 illustrates a flow chart of steps for manufacturing an embodiment of a multi-component fluid mixing device.

FIG. 8 illustrates a flow chart of steps for manufacturing an embodiment of a multi-component fluid mixing device.

According to an embodiment of a manufacturing method illustrated in FIG. 8, at step 851, a first part and a second part of the multi-component fluid mixing device are formed. The first part and second part may be formed by injection molding or by a machining process. According to an embodiment, the first part and second part are two halves that are near mirror images of one another, split along a Y-Z plane according to the coordinate system indicated in FIG. 5.

At step 852, the first part and a second part are mated together with the mixing element retained or captured in the mixing wall between the first part and second part. Preferably, the mixing wall fits snugly around the mixing element to help prevent the multi-component fluid from bypassing the mixing element.

At step 853, the first part and the second part are bonded together to form the multi-component fluid mixing device. According to one embodiment, the bonding comprises ultrasonic welding. According to another embodiment, the bonding comprises adhesive bonding. In yet another embodiment, both ultrasonic welding and adhesive bonding are used to bond the first part and the second part together. A person of ordinary skill in the art would understand that a variety of different bonding methods may be used, without limitation, to bond the first part and the second part together.

A person of ordinary skill in the art would understand that the embodiments described herein may be attached to, used with, or modified to be compatible with any multi-component fluid dispensing device for dispensing any number of fluid components, including a robotic tool body, a manual dispensing device, or a mixing gun, etc., without limitation. It is understood that the term fluid may refer to liquids or gasses and the disclosed embodiments are not limited to any particular materials to be mixed. Embodiments disclosed herein may be configured to mix two or more liquids, two or more gases, or any combination of any number of fluids and gasses, in any mixing ratio.

Any of the aspects, embodiments, and features of the invention can be freely combined, and such combinations are within the scope of the invention. For example, in some aspects, the invention contemplates use of multiple different inventive configurations of a multi-component fluid mixing device. For example, multi-component fluid mixing device may include a serpentine flow path or a straight flow path with an attachment point decoupled from the inlet, or the multi-component fluid mixing device may include both a serpentine flow path and an attachment point decoupled from the inlet. Any device of the invention may be formed with or without any combination of one or more of the aspects or features disclosed herein.

All references (e.g., printed publications such as books, papers, patents, patent applications, catalogs, databases) are incorporated herein by reference. In the event of a conflict or inconsistency, the present specification, as modified by any amendments thereto, shall control.

Those skilled in the art will recognize, or be able to ascertain using no more than routine experimentation, many equivalents to the specific embodiments of the invention described herein. The scope of the present invention is not intended to be limited to the above Description, but rather is as set forth in the appended claims. It will be appreciated that the invention is in no way dependent upon particular results achieved in any specific example or with any specific embodiment. Articles such as "a", "an" and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention also includes embodiments in which more than one, or all of the group members are present in, employed in, or otherwise relevant to a given product or process. Furthermore, it is to be understood that the invention encompasses all variations, combinations, and permutations in which one or more limitations, elements, clauses, descriptive terms, etc., from one or more of the listed claims or from the description above is introduced into another claim. For example, any claim that is dependent on another claim can be modified to include one or more elements, limitations, clauses, or descriptive terms, found in any other claim that is dependent on the same base claim.

The figures are set forth to illustrate various aspects and features of specific embodiments and should not be construed to limit the full scope of the invention as defined by the appended claims.

Where elements are presented as lists, it is to be understood that each subgroup of the elements is also disclosed, and any element(s) can be removed from the group. For purposes of conciseness only some of these embodiments have been specifically recited herein, but the invention includes all such embodiments. It should also be understood that, in general, where the invention, or aspects of the invention, is/are referred to as comprising particular elements, features, etc., certain embodiments of the invention or aspects of the invention consist, or consist essentially of, such elements, features, etc.

Where ranges are given, endpoints are included. Furthermore, it is to be understood that unless otherwise indicated or otherwise evident from the context and understanding of one of ordinary skill in the art, values that are expressed as ranges can assume any specific value or subrange within the stated ranges in different embodiments of the invention, to the tenth of the unit of the lower limit of the range, unless the context clearly dictates otherwise. Any particular embodiment, aspect, element, feature, etc., of the present invention, or any combination thereof, may be explicitly excluded from any one or more claims whether or not such exclusion is expressly recited herein.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A multi-component fluid mixing device comprising:
   a first static mixer configured to:
      receive a first fluid component and a second fluid component, which form a multi-component fluid, and
      at least partially mix the multi-component fluid as the multi-component fluid flows in a first flow direction along a longitudinal axis of the first static mixer;
   a second static mixer configured to:
      receive the multi-component fluid, and
      further mix the multi-component fluid as the multi-component fluid flows in a second flow direction, different from the first flow direction, along a longitudinal axis of the second static mixer;
   a first connecting channel connecting a second end of the first static mixer to a first end of the second static mixer to form a flow path of the multi-component fluid;
   an outlet including an opening defined by a surface of the multi-component fluid mixing device, the outlet connected to the flow path of the multi-component fluid and configured to output the mixed multi-component fluid through the opening, a longitudinal axis of the outlet including the opening co-axial with the longitudinal axis of the second static mixer;
   a third static mixer;
   wherein the static mixers are positioned parallel to each other and the flow path alternates between the first flow direction and the second flow direction, creating a serpentine flow path;
   a fourth static mixer, wherein the first static mixer, the second static mixer, the third static mixer, and the fourth static mixer are disposed in a canister in a circular arrangement around a central axis, the canister disposed between a first end piece and a second end piece, the second end piece comprising an inlet and the outlet, the first end piece and the second piece comprising an end piece set;
   a first end piece proximate to a first end of the first static mixer;
   a second end piece proximate to the second end of the first static mixer and containing the first connecting channel, the second end piece comprising an inlet and the outlet, the first end piece and the second piece comprising an end piece set, and the canister disposed between the first end piece and the second end piece;

a first channel group comprising the first connecting channel;

a second of channel group comprising a second connecting channel housed in the first end piece and a third connecting channel housed in the second end piece;

wherein the first channel group is configured to connect the first static mixer and the second static mixer to form the flow path of the multi-component fluid, excluding the third static mixer and the fourth static mixer from the flow path of the multi-component fluid, and wherein the second channel group is configured to connect the first static mixer, the second static mixer, the third static mixer, and the fourth static mixer to form the flow path of the multi-component fluid; and an adjustment mechanism configured to rotate one of the canister and the end piece set in a rotation to switch between the first channel group in a first position and the second channel group in a second position, wherein the inlet of the first end piece is configured to align with the first channel group in the first position or the second channel group in the second position based on the rotation.

2. The multi-component fluid mixing device of claim 1, wherein the longitudinal axis of the first static mixer is parallel to the longitudinal axis of the second static mixer and the second flow direction is opposite the first flow direction.

3. The multi-component fluid mixing device of claim 1, further comprising:

a first inlet configured to receive the first fluid component;

a second inlet configured to receive the second fluid component, the second inlet spaced from the first inlet at a first width, the first inlet and the second inlet configured to connect to a first outlet and a second outlet of a multicomponent fluid dispensing device, the first width disposed on a horizontal plane that is perpendicular to the longitudinal axis of the outlet;

wherein a first end of the first static mixer is connected to the first and second inlets.

4. The multi-component fluid mixing device of claim 1, wherein the outlet is further configured to receive a dispensing tip.

5. The multi-component fluid mixing device of claim 1, further comprising an attachment mechanism configured to secure the multi-component fluid mixing device to a multi-component fluid dispensing device, wherein a location of the attachment mechanism is fixed at a specified distance from the outlet.

6. A multi-component fluid mixing device comprising:
a first static mixer configured to:
receive a first fluid component and a second fluid component, which form a multi-component fluid, and
at least partially mix the multi-component fluid as the multi-component fluid flows in a first flow direction along a longitudinal axis of the first static mixer;
a second static mixer configured to:
receive the multi-component fluid, and
further mix the multi-component fluid as the multi-component fluid flows in a second flow direction, different from the first flow direction, along a longitudinal axis of the second static mixer;
a first connecting channel connecting a second end of the first static mixer to a first end of the second static mixer to form a flow path of the multi-component fluid;
a third static mixer;

a fourth static mixer, wherein the first static mixer, the second static mixer, the third static mixer, and the fourth static mixer are disposed in a canister in a circular arrangement around a central axis, and the static mixers are positioned parallel to each other and the flow path alternates between the first flow direction and the second flow direction, creating a serpentine flow path;

an outlet connected to the flow path of the multi-component fluid and configured to output the mixed multi-component fluid;

wherein the canister is disposed between a first end piece and a second end piece, the second end piece comprising an inlet and the outlet, the first end piece and the second piece comprising an end piece set;

a first channel group comprising the first connecting channel;

a second of channel group comprising a second connecting channel housed in the first end piece and a third connecting channel housed in the second end piece;

wherein the first channel group is configured to connect the first static mixer and the second static mixer to form the flow path of the multi-component fluid, excluding the third static mixer and the fourth static mixer from the flow path of the multi-component fluid; and wherein the second channel group is configured to connect the first static mixer, the second static mixer, the third static mixer, and the fourth static mixer to form the flow path of the multi-component fluid; and an adjustment mechanism configured to rotate one of the canister and the end piece set in a rotation to switch between the first channel group in a first position and the second channel group in a second position, wherein the inlet of the first end piece is configured to align with the first channel group in the first position or the second channel group in the second position based on the rotation.

7. The multi-component fluid mixing device of claim 6, wherein:
the first end piece is proximate to a first end of the first static mixer;
the second end piece is proximate to the second end of the first static mixer and contains the first connecting channel.

8. The multi-component fluid mixing device of claim 6, wherein the outlet includes an opening defined by a surface of the multi-component fluid mixing device, the outlet is connected to the flow path of the multi-component fluid and configured to output the mixed multi-component fluid through the opening, and a longitudinal axis of the outlet including the opening is co-axial with the longitudinal axis of the second static mixer.

9. The multi-component fluid mixing device of claim 6, further comprising an attachment mechanism configured to secure the multi-component fluid mixing device to a multi-component fluid dispensing device, wherein a location of the attachment mechanism is fixed at a specified distance from the outlet.

10. The multi-component fluid mixing device of claim 6, wherein the longitudinal axis of the first static mixer is parallel to the longitudinal axis of the second static mixer and the second flow direction is opposite the first flow direction.

11. The multi-component fluid mixing device of claim 6, further comprising:
a first inlet configured to receive the first fluid component;

a second inlet configured to receive the second fluid component, the first inlet and the second inlet configured to connect to a first outlet and a second outlet of a multicomponent fluid dispensing device;

wherein a first end of the first static mixer is connected to the first and second inlets.

12. The multi-component fluid mixing device of claim 11, wherein the second inlet is spaced from the first inlet at a first width, and the first width is disposed on a horizontal plane that is perpendicular to the longitudinal axis of the outlet.

13. A multi-component fluid mixing device comprising:
a first static mixer configured to:
receive a first fluid component and a second fluid component, which form a multi-component fluid, and
at least partially mix the multi-component fluid as the multi-component fluid flows in a first flow direction along a longitudinal axis of the first static mixer;
a second static mixer configured to:
receive the multi-component fluid, and
further mix the multi-component fluid as the multi-component fluid flows in a second flow direction, different from the first flow direction, along a longitudinal axis of the second static mixer;
a first connecting channel connecting a second end of the first static mixer to a first end of the second static mixer to form a flow path of the multi-component fluid;
a third static mixer;
a fourth static mixer, wherein the first static mixer, the second static mixer, the third static mixer, and the fourth static mixer are disposed in a canister in a circular arrangement around a central axis, and the static mixers are positioned parallel to each other and the flow path alternates between the first flow direction and the second flow direction, creating a serpentine flow path; and
an outlet connected to the flow path of the multi-component fluid and configured to output the mixed multi-component fluid;
wherein the outlet includes an opening defined by a surface of the multi-component fluid mixing device, the outlet is connected to the flow path of the multi-component fluid and configured to output the mixed multi-component fluid through the opening, and a longitudinal axis of the outlet including the opening is co-axial with the longitudinal axis of the second static mixer.

* * * * *